US011093353B2

(12) United States Patent
Hoshino (10) Patent No.: US 11,093,353 B2
(45) Date of Patent: Aug. 17, 2021

(54) VIRTUAL NETWORK SYSTEM, VIM, VIRTUAL NETWORK CONTROL METHOD AND RECORDING MEDIUM

(71) Applicant: NEC Corporation, Tokyo (JP)

(72) Inventor: Yoshihiko Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 161 days.

(21) Appl. No.: 16/491,222

(22) PCT Filed: Mar. 16, 2018

(86) PCT No.: PCT/JP2018/010516
§ 371 (c)(1),
(2) Date: Sep. 5, 2019

(87) PCT Pub. No.: WO2018/180613
PCT Pub. Date: Oct. 4, 2018

(65) Prior Publication Data
US 2020/0034180 A1    Jan. 30, 2020

(30) Foreign Application Priority Data

Mar. 29, 2017 (JP) .............................. JP2017-064167

(51) Int. Cl.
*G06F 11/20* (2006.01)
*G06F 9/455* (2018.01)
*G06F 9/50* (2006.01)

(52) U.S. Cl.
CPC ...... *G06F 11/2023* (2013.01); *G06F 9/45558* (2013.01); *G06F 9/5077* (2013.01); *G06F 2009/45595* (2013.01)

(58) Field of Classification Search
CPC ............... G06F 9/45558; G06F 9/5077; G06F 2009/45595; G06F 11/2023
See application file for complete search history.

(56) References Cited

U.S. PATENT DOCUMENTS 10,379,896 B2 * 8/2019 Sergeev .............. G06F 11/3055
10,789,091 B2 * 9/2020 Abali .................. G06F 9/45558
(Continued)

FOREIGN PATENT DOCUMENTS

WO    2016/121834 A1    3/2016
WO    2016/117694 A1    7/2016
(Continued)

OTHER PUBLICATIONS

"Network Functions Virtualisation (NFV); Architectural Framework", ETSI GS NFV 002 V1.2.1, Sophia Antipolis Cedex, France, Dec. 2014, 21 pages total.
(Continued)

*Primary Examiner* — Jacob D Dascomb
(74) *Attorney, Agent, or Firm* — Sughrue Mion, PLLC (57) ABSTRACT

A virtual network system includes a first virtualized network function (VNF), a second VNF, a network functions virtualization infrastructure (NFVI), and a virtualized infrastructure manager (VIM). The VNF performs a network function. The second VNF provides a backup of the first VNF, and provides redundant configuration with the first VNF. The NFVI provides a virtual resource that is a virtualization of a physical resource. The VIM instructs the NFVI to provide the virtual resource as a resource for performing the first VNF and the second VNF, and instructs the NFVI to cancel provision of the virtual resource to the first VNF and to provide the virtual resource as a resource for performing the second VNF when the second VNF is performed and the first VNF is made a backup of the second VNF.

6 Claims, 11 Drawing Sheets

(56) References Cited

U.S. PATENT DOCUMENTS

| | | |
|---|---|---|
| 2014/0007097 A1 | 1/2014 | Chin et al. |
| 2018/0011730 A1 | 1/2018 | Zembutsu et al. |
| 2018/0018192 A1 | 1/2018 | Gokurakuji et al. |
| 2018/0024898 A1 | 1/2018 | Yoshikawa |
| 2020/0218564 A1* | 7/2020 | Miller ................. G06F 9/45558 |

FOREIGN PATENT DOCUMENTS

| | | |
|---|---|---|
| WO | 2016/121728 A1 | 8/2016 |
| WO | 2016/125387 A1 | 8/2016 |
| WO | 2017/041525 A1 | 3/2017 |

OTHER PUBLICATIONS

OpenStack Operations Guide, The OpenStack Foundation, Internet <URL: https://docs.openstack.org/openstack-ansible/latest/admin/index.html>, [retrieved Mar. 23, 2017], 6 pages total.

International Search Report dated Jun. 12, 2018 issued by the International Searching Authority in International Application No. PCT/JP2018/010516.

Written Opinion dated Jun. 12, 2018 issued by the International Searching Authority in International Application No. PCT/JP2018/010516.

Japanese Office Action for JP Application No. 2019-509295 dated May 26, 2020 with English Translation.

Extended European Search Report for EP Application No. EP18778118.2 dated Feb. 24, 2020.

\* cited by examiner

| NAME OF VNF | HARD STORAGE VOLUME | OPERATING TIME | OPERATION TERMINATION TIME | CONNECTION RELATIONSHIP | REDUDANT CONFIGURATION INFORMATION |
|---|---|---|---|---|---|
| VNF10-1 | 20GB | 24h | 120h | Port1:VNF10-3 | Active |
| VNF10-2 | 20GB | 24h | 120h | --- | VNF10-2:Standby |
| VNF10-3 | 100GB | 360h | 1000h | Port3:VNF10-1 | |
| VNF10-4 | 70GB | 85h | 100h | --- | |

| BLOCK NUMBER | NAME OF VNF |
|---|---|
| 23-1 | ---- |
| 23-2 | VNF10-1 |
| 23-3 | VNF10-2 |
| 23-4 | ---- |
| 23-5 | ---- |

VIRTUAL NETWORK SYSTEM, VIM, VIRTUAL NETWORK CONTROL METHOD AND RECORDING MEDIUM

This application is a National Stage Entry of PCT/JP2018/010516 filed on Mar. 16, 2018, which claims priority from Japanese Patent Application 2017-064167 filed on Mar. 29, 2017, the contents of all of which are incorporated herein by reference, in their entirety.

TECHNICAL FIELD

The present invention relates to a virtual network system, a VIM, a virtual network control method and a recording medium.

BACKGROUND ART

A known network function virtualization (NFV) implements functions of network equipment in a software manner by using a virtual machine (VM) implemented on a virtualized layer such as a hypervisor on a server.

Figure 10:
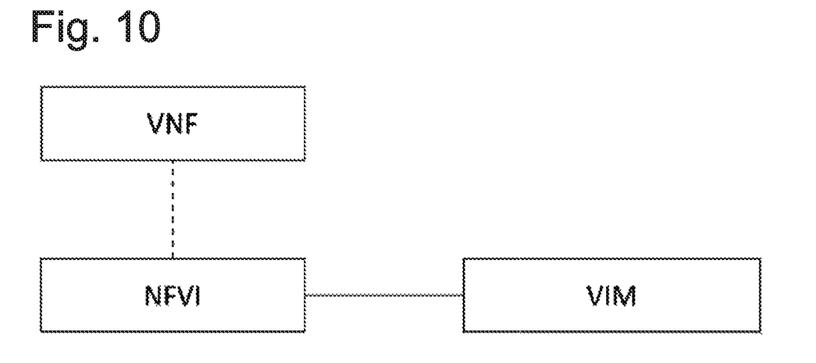
FIG. 10 is a diagram extracted from Chapter 7, FIG. 4 of Non Patent Literature 1.

FIG. 10 is a diagram extracted from Chapter 7, FIG. 4 of Non Patent Literature (NPL) 1. A configuration of a case where a virtual network is built using the NFV is explained with reference to FIG. 10.

The network functions virtualization infrastructure (NFVI) is an infrastructure that makes it possible to virtualize a physically provided resource (physical resource) such as computing, a storage or network equipment by using a hypervisor or the like, and thereby provide them as a virtual resource such as virtualized computing, a virtualized storage or a virtualized network.

The hypervisor is a virtual machine that provides a virtualized network function (VNF). The VNF is a function (application) which implements a network function in a software manner. The VNF is performed on the hypervisor.

A virtualized infrastructure manager (VIM) performs management of the physical resource provided by the NFVI, failure monitoring of the NFVI and monitoring of resource information.

One way for implementing the NFVI is to use the OpenStack (Non Patent Literature (NPL) 2). The OpenStack is a group of software packages for building a virtual environment. More specifically, the OpenStack has functions needed to provide a virtual resource. The respective functions are modularized, and can be integrated or separated as necessary. One of the functions is a cinder function.

The cinder function is a block storage function in the OpenStack. The block storage function is a function which administrates the volume of a physical storage in fixed-length blocks. For example, the block storage function performs a control as to which block (may be referred to as storage hereinafter) of the physical storage of the NFVI the data used by the VNF is placed to.

When placing the VNFs on the NFVI administrated by the block storage function, the respective VNFs are assigned with storages of different sections. For example, to configure the hypervisor redundantly, that is, to make the network operable allowing a switchover between an active hypervisor and a standby hypervisor to be performed, the VNF placed on the active hypervisor and the VNF placed on the standby hypervisor have to be assigned with different blocks. Accordingly, the VNF of the standby hypervisor cannot use the block storage which is being used by the active hypervisor.

When starting the standby hypervisor while making the active hypervisor standby, for the standby hypervisor to take over the service being provided by the active hypervisor, it is necessary to transfer the setup information of the VNF on the active hypervisor to the VNF on the standby hypervisor. In other words, it is necessary to establish synchronization between the block assigned to the VNF on the active hypervisor and the block assigned to the VNF on the standby hypervisor.

CITATION LIST

Patent Literature

[PTL 1] International Publication No. 2016/121834

Non Patent Literature

[NPL 1] European Telecommunications Standards Institute, "ETSI GS NFV 002 V1.2.1 (2014-12)", [online], December, 2004, [retrieved Mar. 23, 2017], Internet<URL:http://www.etsi.org/deliver/etsi_gs/nfv/001_099/002/01.02.01_60/gs_NFV002v010201p.pdf>

[NPL 2] The OpenStack Foundation, "Operations Guide", [online], [retrieved, Mar. 23, 2017], Internet <URL: https://docs.openstack.org/openstack-ansible/latest/admin/index.html>

SUMMARY OF INVENTION

Technical Problem

Figure 11:
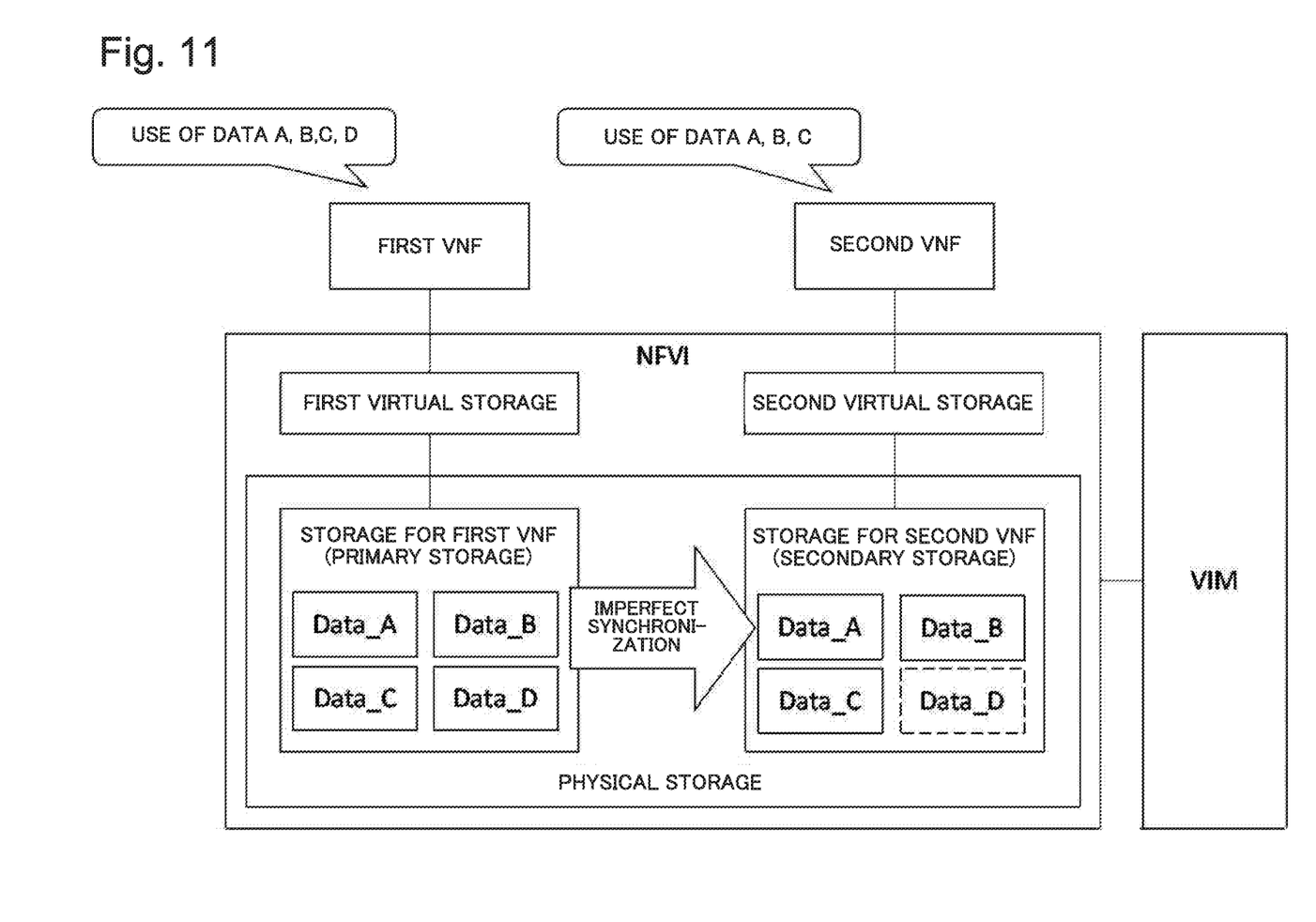
FIG. 11 is a block diagram illustrating a redundant configuration of a VNF in which a first VNF is active and a second VNF is standby.

FIG. 11 is a block diagram illustrating an example of a redundant configuration of the VNF in which a first VNF is active and a second VNF is standby. For example, when performing a switchover between the first VNF and the second VNF in the redundant configuration as illustrated in FIG. 11, the data recorded in the block assigned to the virtual storage provided in the first VNF are synchronized with the block assigned to the virtual storage provided in the second VNF, and the second VNF is started. That is, the four data Data_A, Data_B, Data_C and Data_D recorded in the storage (primary storage) for the first VNF are synchronized with the storage (secondary storage) for the second VNF.

However, the work for establishing the synchronization between the storages requires time. Accordingly, if it takes too much time for the synchronization, there is a concern that the second VNF may start before the synchronization is established.

For example, as illustrated in FIG. 11, if the second VNF starts without the Data_D being synchronized with the second VNF storage, there is a concern that a correct process is not performed due to occurrence of an error in a behavior relevant to this data or the like.

Accordingly, an object of the present invention is to enable physical storage assignment change for preventing imperfect synchronization which may occur during a switchover between active and standby in a system having a redundant configuration.

Solution to Problem

A virtual network system according to one aspect of the present invention includes
a first virtualized network function (VNF) including:
a storage; and
at least one processor, the processor reading a software from the storage and performing operations, the operations including:
performing a network function implemented by the software;
a second VNF including:
a storage; and
at least one processor,
the processor reading a software from the storage and performing operation, the operation including:
providing a backup of the first VNF and providing redundant configuration with the first VNF.

The virtual network system includes:
a network functions virtualization infrastructure (NFVI) including
a storage; and
at least one processor,
the processor reading a software from the storage and performing operations, the operation including:
providing a virtual resource that is a virtualization of a physical resource; and
a virtualized infrastructure manager (VIM) including
a storage; and
at least one processor,
the processor reading a software from the storage and performing operations, the operation including:
instructing the NFVI to provide the virtual resource as a resource for performing the first VNF and the second VNF, and
when the second VNF is performed and the first VNF is made a backup of the second VNF, instructing the NFVI to cancel provision of the virtual resource to the first VNF and to provide the virtual resource as a resource for performing the second VNF.

A virtualized infrastructure manager (VIM) according to one aspect of the present invention in a virtual network system has a redundant configuration by
a first virtualized network function (VNF) performed as a network function implemented by software and
a second VNF provided as a backup of the first VNF.
The VIM includes:
a storage; and
at least one processor,
the processor reading a software from the storage and performing operations, the operation including:
sending and receiving messages with a network functions virtualization infrastructure (NFVI) that provides a virtual resource that is a virtualization of a physical resource; and
when the second VNF is performed and the first VNF is made a backup of the second VNF, instructing the NFVI to cancel provision of a virtual resource to the first VNF and to provide the virtual resource as a resource for performing the second VNF.

A virtual network control method according to one aspect of the present invention in a virtual network system has a redundant configuration by a first virtualized network function (VNF) performed as a network function implemented by software and a second VNF provided as a backup of the first VNF. The virtual network control method includes:
when the second VNF is performed and the first VNF is made a backup of the second VNF,
instructing to cancel provision of a virtual resource to the first VNF; and
to provide the virtual resource as a resource for performing the second VNF.

A non-transitory computer-readable recording medium according to one aspect of the present invention embodies a program.
The program causes a computer to perform a method. The method includes:
in a virtual network system having a redundant configuration by a first virtualized network function (VNF) performed as a network function implemented by software and a second VNF provided as a backup of the first VNF,
when the second VNF is performed and the first VNF is made a backup of the second VNF,
instructing to cancel provision of a virtual resource to the first VNF; and
to provide the virtual resource as a resource for performing the second VNF.

Advantageous Effects of Invention

According to the virtual network system, VIM, virtual network control method and recording medium of the present invention, it is possible to suppress failure under the NFV environment.

EXAMPLE EMBODIMENT

First Example Embodiment

[Explanation of Configuration]
A first example embodiment of the present invention is explained in detail with reference to the drawings.

Figure 1:
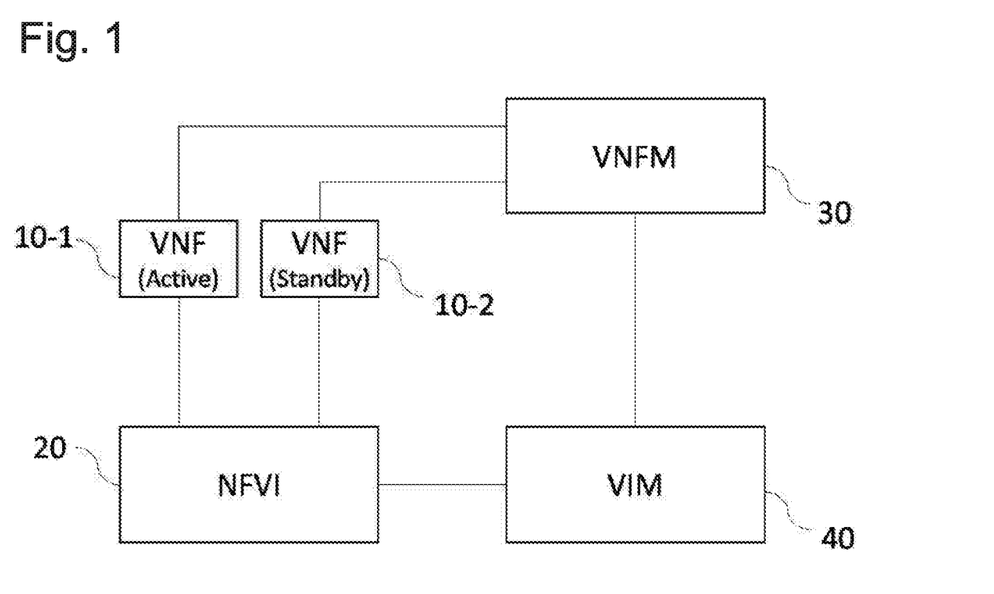
FIG. 1 is a block diagram illustrating an example of a configuration of a system of a first example embodiment.

FIG. 1 is a block diagram illustrating a configuration of a virtual network system according to the first example embodiment.

The virtual network system according to the first example embodiment includes a virtualized network function (VNF) 10-1, a VNF 10-2, a network functions virtualization infrastructure (NFVI) 20, a virtualized network function manager (VNFM) 30 and a virtualized infrastructure manager (VIM) 40.

The VNF 10-1 and the VNF 10-2 are configured redundantly, one of them is in a standby state while another is operating. In the following explanation, it is assumed that the VNF 10-1 is treated as an active VNF, and the VNF 10-2 is treated as a standby VNF. When it is not necessary to distinguish the VNFs 10-1 and 10-2 from each other, they are referred to simply as a VNF 10. Also, as to hypervisors 50-1 and 50-2, and virtual storages 22-1 and 22-2, when it is not necessary to distinguish them from each other, they are respectively referred to simply as a hypervisor 50 and a virtual storage 22.

Figure 2:
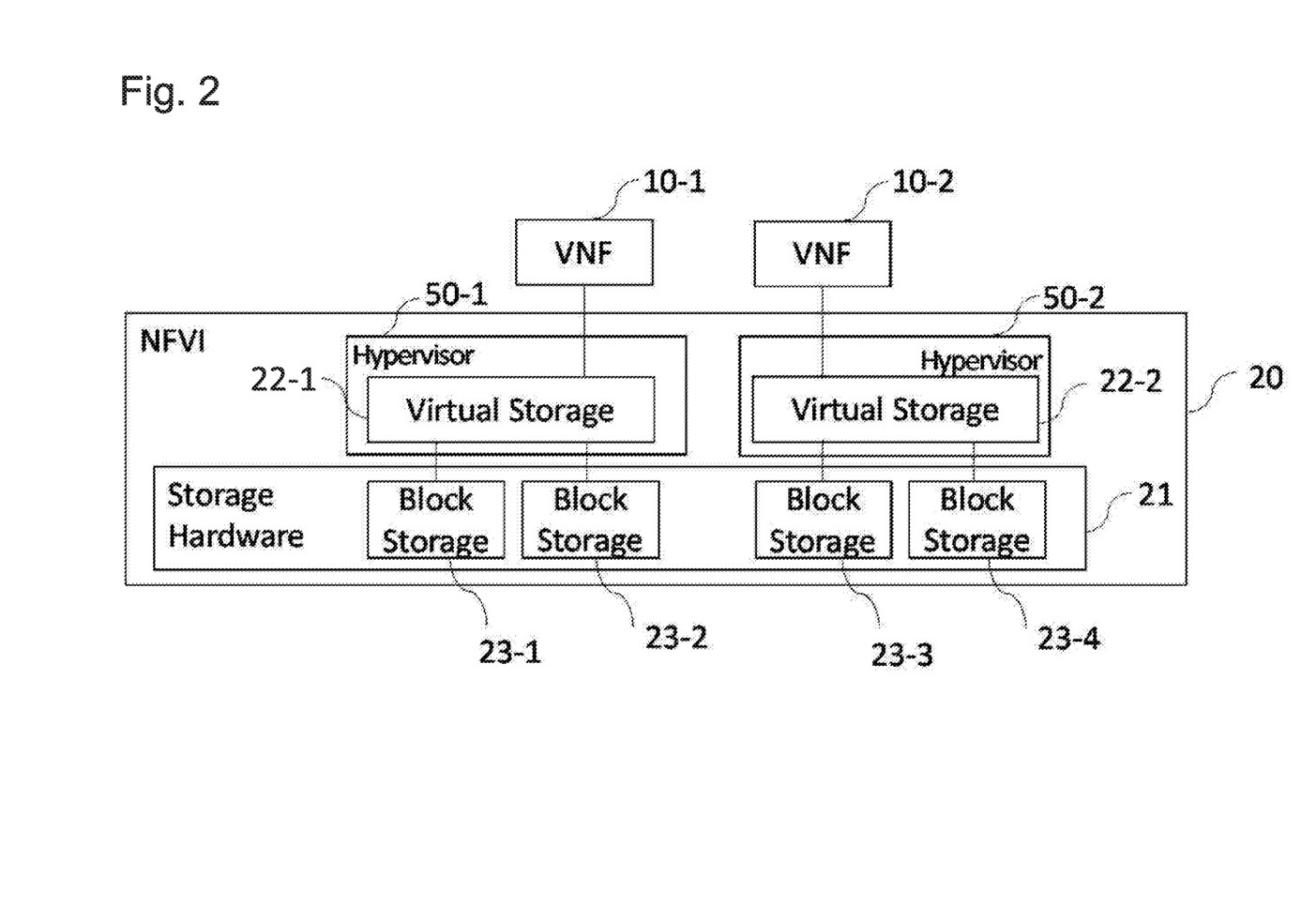
FIG. 2 is a block diagram illustrating an example of connection among an NFVI 20, VNFs 10 and hypervisors 50 of the first example embodiment.

FIG. 2 is a block diagram illustrating an example of connection between the NFVI 20 and the VNF 10.

The VNF 10 is a function which implements a network function in a software manner. The VNF 10 is controlled by the hypervisor 50. For example, the VNF 10 is a mobility manager entity (MME), a serving gateway (S-GW), a packet data network gateway (P-GW), or the like in an evolved packet core (EPC) which is a core network of a long term evolution network (LTE).

The VNF 10 is placed on a resource provided by the NFVI 20. Specifically, the VNF 10 is placed on the virtual storage 22 provided to the VNF 10. The VNF 10 is not limited to the configuration in which one VNF 10 is placed to one virtual storage 22. For example, a plurality of the VNFs 10 may be placed to one virtual storage 22, or one VNF 10 may be configured to place to a plurality of the virtual storages 22.

The VNF 10 sends information regarding the VNF 10 towards the VNFM 30 at predetermined timings. The information regarding the VNF 10 is information, such as the name, operating time, or connection relationship, of the VNF 10, for example.

The VNF 10 sends a configuration notification and an event notification towards the VNFM 30. For example, the VNF 10-1 sends, towards the VNFM 30, a message (state change notification) for notifying that the VNF 10-1 has changed from an active state (ACTIVE) in which the VNF 10-1 performs a system operation as an active VNF to a standby state (STANDBY) in which the VNF 10-1 does not perform the system operation The NFVI 20 includes a physical storage (storage hardware) 21 and a virtual storage 22 which is a virtualization of the physical storage 21. The virtual storage 22 is provided by the hypervisor 50.

The NFVI 20 virtualizes the physical storage 21 in accordance with a message received from the VIM 40, and provides the physical storage 21 as the virtual storage 22 which is a single logical storage. In the following explanation, virtualizing the physical storage 21 into the virtual storage 22 is expressed simply as connecting the physical storage 21 to the virtual storage 22.

The NFVI 20 connects the physical storage 21 to the virtual storage 22 in accordance with a message received from the VIM 40. Specifically, when receiving a message from the VIM 40 notifying that a block storage 23-2 is assigned to the virtual storage 22-1, the NFVI 20 connects the block storage 23-2 to the virtual storage 22-1. Also, when receiving a message from the VIM 40 notifying that the assignment of the block storage 23-2 to the virtual storage 22-1 is deleted, the NFVI 20 cuts the connection between the virtual storage 22-1 and the block storage 23-2.

In the NFVI 20 illustrated in FIG. 2, the virtual storage 22-1 is a virtualization as one storage connecting the block storages 23-1 and 23-2 of the physical storage 21. The number of the block storages (the number of blocks) to be assigned to the virtual storages 22 is not limited thereto. For example, the virtual storages 22 may be a virtualization of one block storage, or a virtualization of three or more block storages.

For example, the hypervisor 50-1 described in FIG. 2 is connected to the block storages 23-1 and 23-2, and provides the VNF 10-1 by using data stored in the block storage 23-2.

Figure 3:
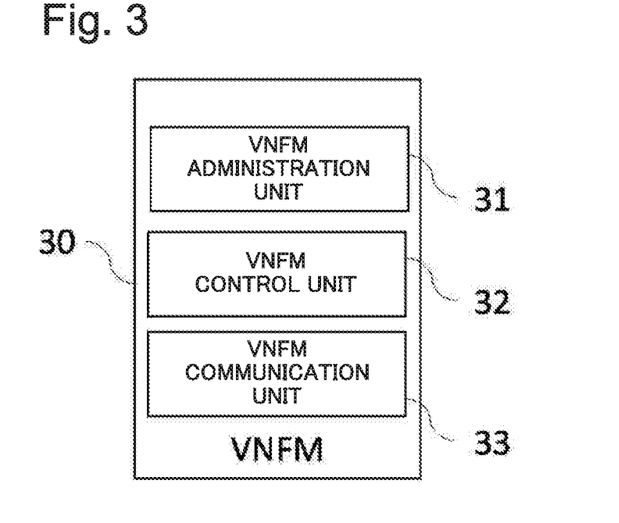
FIG. 3 is a block diagram illustrating an example of a configuration of a VNFM 30 of the first example embodiment.

FIG. 3 is a block diagram illustrating an example of a configuration of the VNFM 30 according to the first example embodiment.

The VNFM 30 includes a VNFM administration unit 31, a VNFM control unit 32 and a VNFM communication unit 33.

Figure 4:
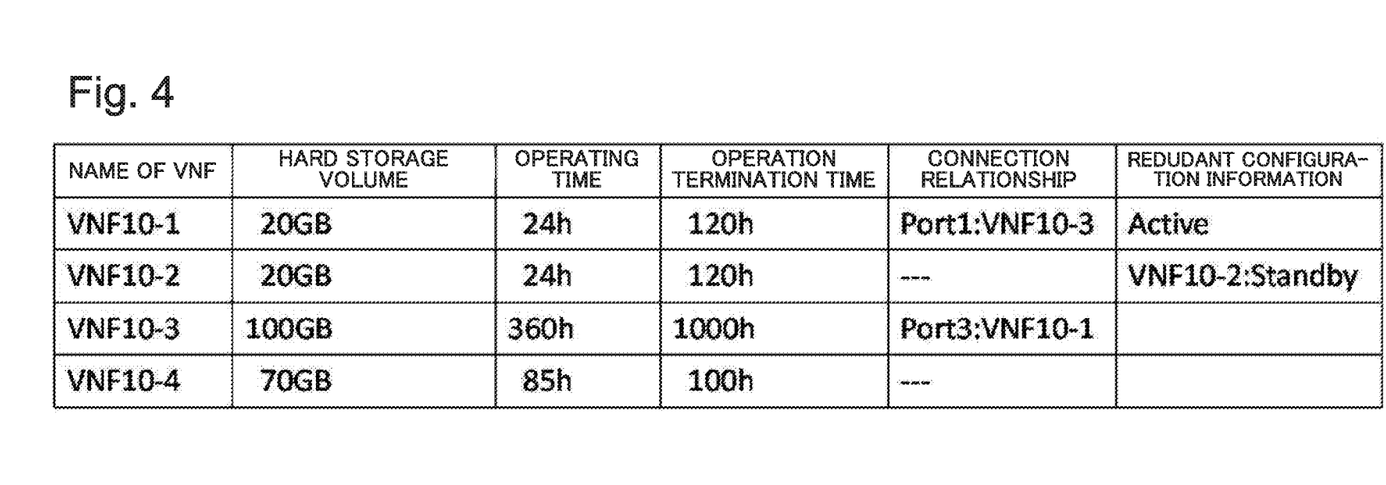
FIG. 4 is a table illustrating an example of information stored by a VNFM administration unit 31 of the first example embodiment.

The VNFM 30 performs a life cycle management (instantiation, scaling, termination, updating, and the like) of the VNF 10. FIG. 4 is a table illustrating an example of information stored by the VNFM administration unit 31 of the first example embodiment. For example, the VNFM administration unit 31 stores information such as the name, volume occupancy in the physical storage 21, operating time, operation termination time, connection relationships of each VNF 10, information (redundant configuration information) showing relationship between the active VNF and the standby VNF. Note that the information stored in the VNFM administration unit 31 is not limited to the above described items. The VNFM administration unit 31 updates the stored information at predetermined timings. For example, the VNFM administration unit 31 updates the stored information at a timing when the operating time of the VNF 10 reaches a predetermined time, a timing when a connection between the VNFs 10 changes, a timing when an update request is received from an external device or the like. For example, the VNFM control unit 32 refers to the operating time of the VNF 10 stored by the VNFM administration unit 31, and sends a message showing an instruction to stop the VNF 10 whose operating time has exceeded the predetermined time through the VNFM communication unit 33.

The VNFM 30 sends information of a resource assignment request and a virtual resource towards the VIM 40. Specifically, when receiving a message notifying that the VNF 10-1 changes from active to standby in state, the VNFM control unit 32 sends a message instructing to delete the virtual storage 22-1 of the VNF 10-1 towards the VIM 40.

Figure 5:
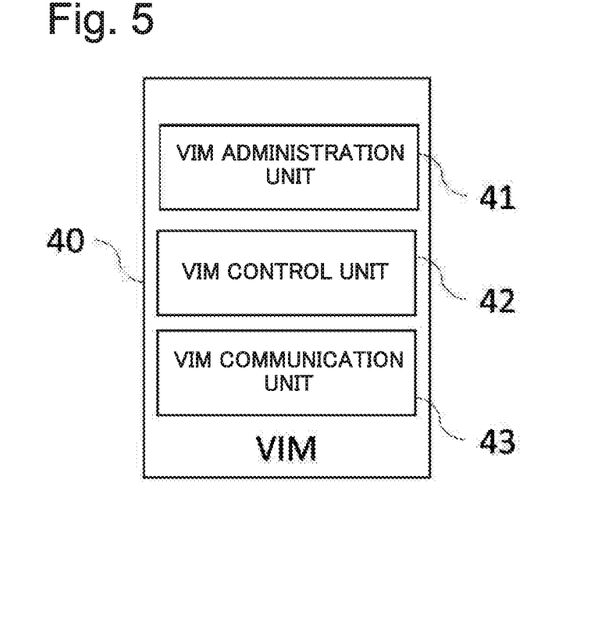
FIG. 5 is a block diagram illustrating an example of a configuration of a VIM 40 of the first example embodiment.

FIG. 5 is a block diagram illustrating an example of a configuration of the VIM 40 according to the first example embodiment.

The VIM 40 includes a VIM administration unit 41, a VIM control unit 42 and a VIM communication unit 43.

The VIM 40 administrates a physical resource (computing, storage, network equipment or the like, for example) provided by the NFVI 20. Specifically, the VIM 40 administrates the physical storage 21 by using the block storage function.

Figure 6:
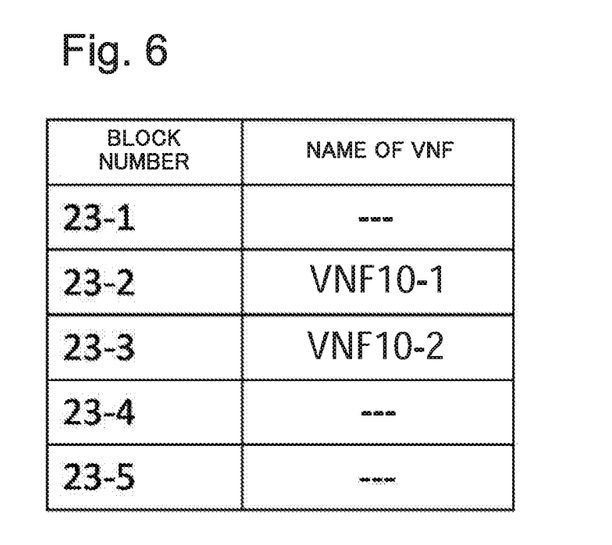
FIG. 6 is a table illustrating an example of information stored by a VIM administration unit 41 of the first example embodiment.

FIG. 6 is a table illustrating an example of information stored by the VIM 40 according to the first example embodiment. The VIM administration unit 41 updates, at the timing of sending, towards the NFVI 20, a message instructing to change assignment of the physical storage 21 to the virtual storage 22, the information showing which block of the physical storage 21 is assigned to the virtual storage 22. The VIM administration unit 41 stores, for example, the numbers given to the fixed-length-divided blocks of the volume of the physical storage 21 of the NFVI 20, the names of the VNFs 10 assigned with these blocks, and the like. Note that the information stored in the VIM administration unit 41 is not limited to the above described items. The information stored in the VIM administration unit 41 may be updated at a timing when the physical storage 21 which connects to the VNF 10 is changed, or may be updated based on information received from a device such as the NFV orchestrator (NFVO) or operation support system (OSS).

The VIM 40 performs failure monitoring of the NFVI 20, monitoring and control of resource information. Specifically, the VIM control unit 42 receives, from the VNFM 30, a message showing an instruction to assign the virtual storage 22-1 of the VNF 10-1 to the VNF 10-2. The VIM 40 refers to the information of the VIM administration unit 41, and confirms that the physical storage 21 assigned to the virtual storage 22-1 provided to the VNF 10-1 is the block storage 23-2. The VIM 40 sends, towards the NFVI 20, a message instructing to cut the connection between the virtual storage 22-1 and the block storage 23-2. The VIM control unit 42 assigns the block storage 23-2 having been assigned to the VNF 10-1 to the VNF 10-2, and sends, towards the NFVI 20, a message instructing to connect the virtual storage 22-2 to the block storage 23-2.

Figure 7:
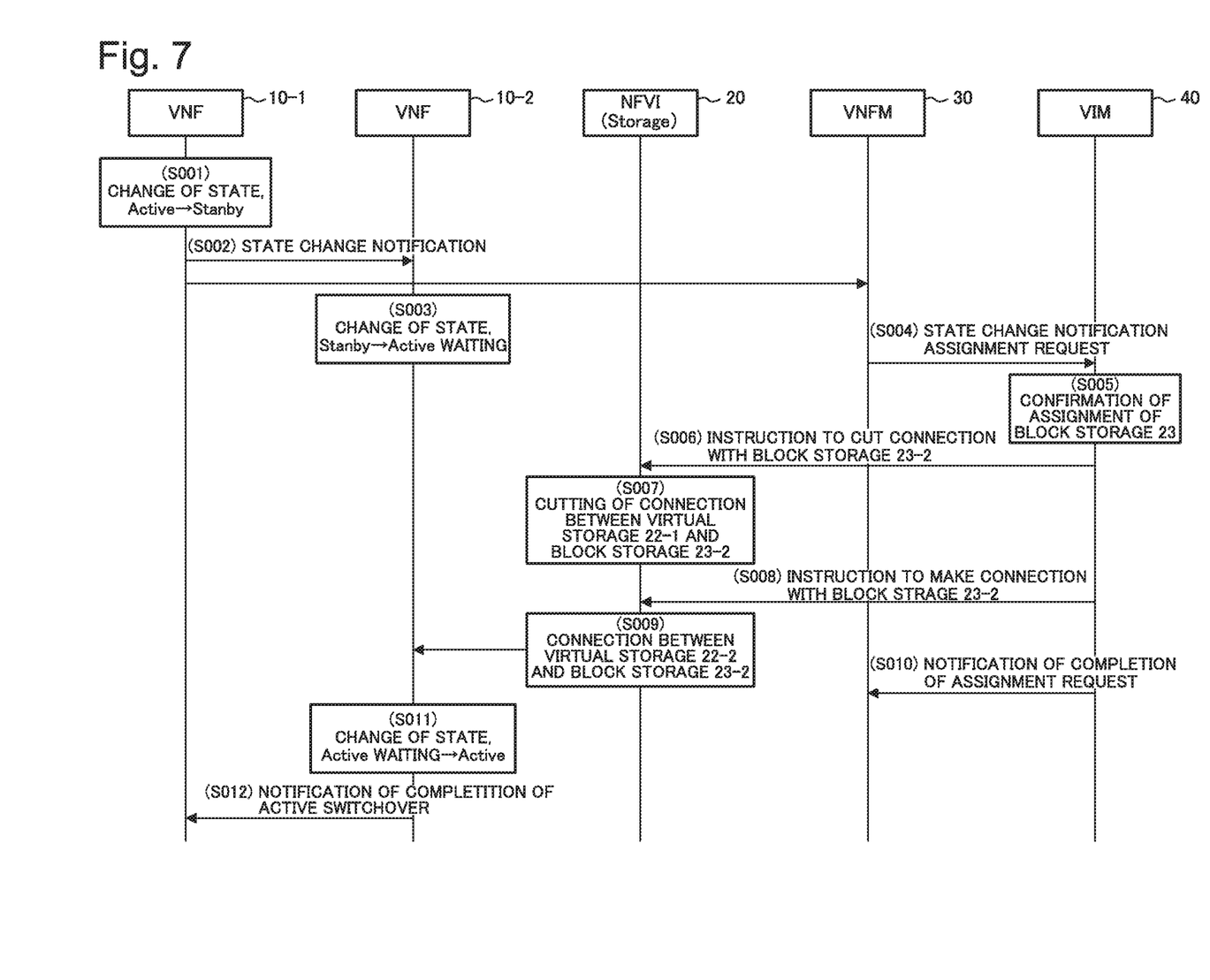
FIG. 7 is a sequence diagram illustrating an operation of the system of the first example embodiment.
Figure 8A:
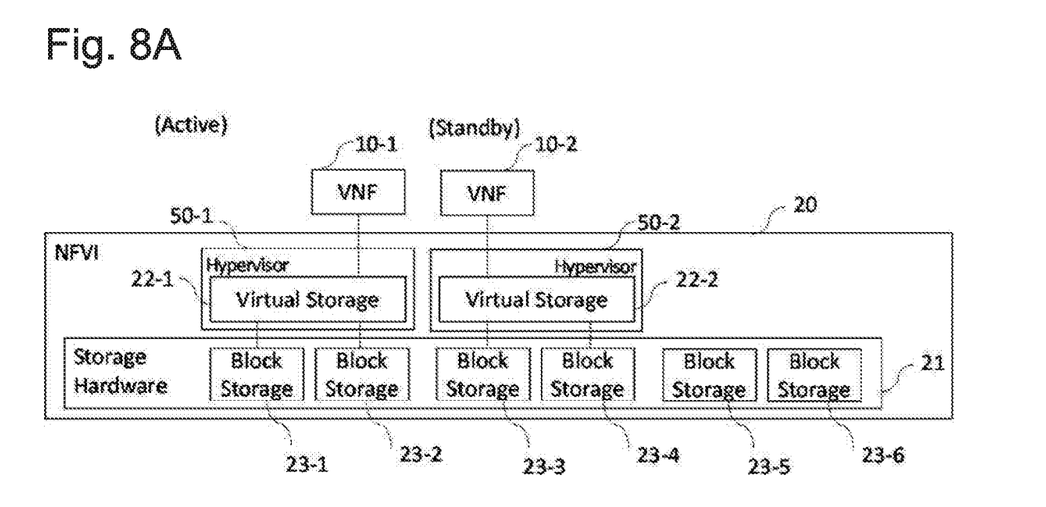
FIG. 8A is a first conceptual diagram illustrating the operation of the system of the first example embodiment.
Figure 8B:
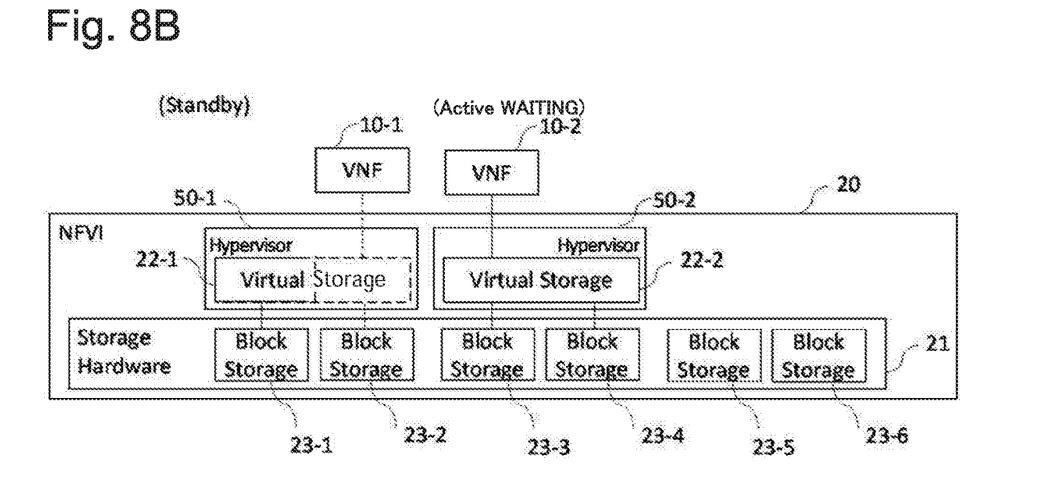
FIG. 8B is a second conceptual diagram illustrating the operation of the system of the first example embodiment.
Figure 8C:
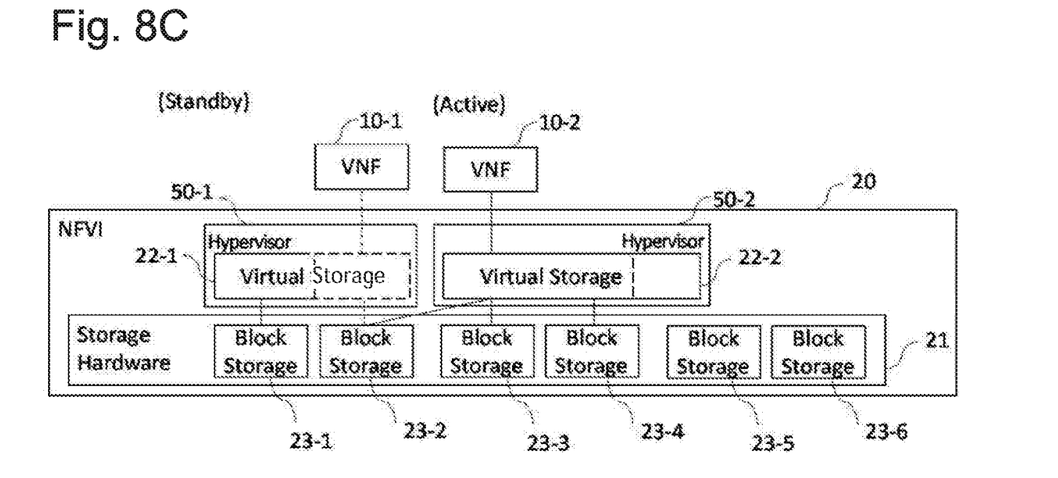
FIG. 8C is a third conceptual diagram illustrating the operation of the system of the first example embodiment.

An operation of the first example embodiment is explained with reference to FIG. 7 and FIGS. 8A to 8C. FIG. 7 is a sequence diagram illustrating an operation of the system according to the first example embodiment. FIGS. 8A to 8C conceptually illustrates the operation according to the first example embodiment.

The hypervisor 50-1 is assigned with the virtual storage 22-1. The virtual storage 22-1 is a virtualization as a single storage connecting the block storages 23-1 and 23-2. Among them, the VNF 10-1 connects to a storage which is a virtualization of the block storage 23-2.

The hypervisor 50-2 is assigned with the virtual storage 22-2. The virtual storage 22-2 is a virtualization as a single storage connecting the block storages 23-3 and 23-4. Among them, the VNF 10-2 connects to a storage which is a virtualization of the block storage 23-3 (FIG. 8A).

The following description explains an example case of a switchover (active/standby switchover) where the active VNF 10-1 is made the standby VNF while the standby VNF 10-2 is made the active VNF. However, the present invention is not limited to the case described below.

When a timing of an active/standby switchover comes, the VNF 10-1 changes the status from the active state (ACTIVE) to the standby state (STANDBY) (S001).

The VNF 10-1 sends a state change notification showing that the status is changed from active to standby towards the VNF 10-2 and the VNFM 30 (S002).

When receiving the state change notification from the VNF 10-1, the VNF 10-2 changes status from standby to a state for preparation of system operation (ACTIVE WAITING) (S003).

When receiving the state change notification from the VNF 10-1, the VNFM 30 sends the state change notification of the VNF 10-1 towards the VIM 40. Further, the VNFM 30 sends, towards the VIM 40, a message (assignment request) instructing to assign the virtual storage 22-1 having been assigned to the VNF 10-1 to the VNF 10-2 (S004).

When receiving the state change notification and the assignment request from the VNFM 30, the VIM 40 confirms that the block storage 23-2 is assigned to the VNF 10-1 from the information stored by the VIM administration unit 41 (S005).

The VIM 40 sends, towards the NFVI 20, a message instructing to cut the connection between the virtual storage 22-1 and the block storage 23-2 in order to delete the virtual storage 22-1 of the VNF 10-1 (S006).

When receiving the message from the VIM 40 instructing to cut the connection between the virtual storage 22-1 and the block storage 23-2, the NFVI 20 cuts the connection between the virtual storage 22-1 and the block storage 23-2 (S007, FIG. 8B).

The VIM 40 sends, towards the NFVI 20, a message instructing to connect the block storage 23-2 to the virtual storage 22-2 of the VNF 10-2 (S008).

When receiving the message from the VIM 40 instructing to connect the virtual storage 22-2 of the VNF 10-2 to the block storage 23-2, the NFVI 20 connects the virtual storage 22-2 to the block storage 23-2 (S009).

After completing the connection between the virtual storage 22-2 and the block storage 23-2, the VIM 40 sends a message, towards the VNFM 30, notifying that the instructed assignment is completed (S010).

After completion of the connection between the virtual storage 22-2 and the block storage 23-2, the VNF 10-2 changes the state of the VNF 10-2 from active waiting to active (S011, FIG. 8C).

The VNF 10-2 sends a message notifying that the state of the VNF 10-2 turns to active towards the VNF 10-1 (S012).

Note that the change to bring the VNF 10-1 from active state to standby is performed at the timing of performing maintenance of the system or at the timing when a failure has occurred. However, the timing to change from active to standby is not limited to the above described items. For example, it may be the timing when the VNF 10-1 exceeds a predetermined operating time, or the timing when a predetermined or higher load is generated in the physical storage 21, or the timing when a predetermined or higher load is generated in the VNF 10. Furthermore, the timing to change from active to standby may be the timing when an instruction is received from a system administrator.

A determination to change the VNF 10-1 from active to standby does not necessarily have to be made by the VNF 10-1. The hypervisor 50-1 may determine, or the VNFM 30 may determine and send a message of instruction towards the hypervisor 50-1 or the VNF 10-1. Furthermore, a unit other than the VNF 10-1, the hypervisor 50-1 or the VNFM 30 may determine the change of the VNF 10-1 from active to standby, and send a message of instruction.

The VNF 10-1 may not send the state change notification towards the VNF 10-2 which is made active in place of the VNF 10-1. For example, the VNFM 30 may send, towards the VNF 10-2, the state change notification by referring to the information of the VNFM administration unit 31 when the VNF 10-1 sends the state change notification towards the VNFM 30.

The VNF 10-2 does not need to notify the VNF 10-1 that the state of the VNF 10-2 turns to active, that is, the VNF 10-2 turns to active. Specifically, the operation of the VNF 10-2 described in S012 does not need to be performed.

The VNF 10-2 may change, when receiving the state change notification from the VNF 10-1, the state of the VNF 10-2 from standby to active when changing from standby to active waiting state.

The VNFM 30 does not need to send the state change notification of the VNF 10-1 towards the VIM 40 when receiving the state change notification from the VNF 10-1.

When receiving the message (assignment request) instructing to assign the virtual storage 22-1 assigned to the VNF 10-1 to the VNF 10-2 from VNFM 30, the VIM 40 performs the operations from S005.

Figure 9:
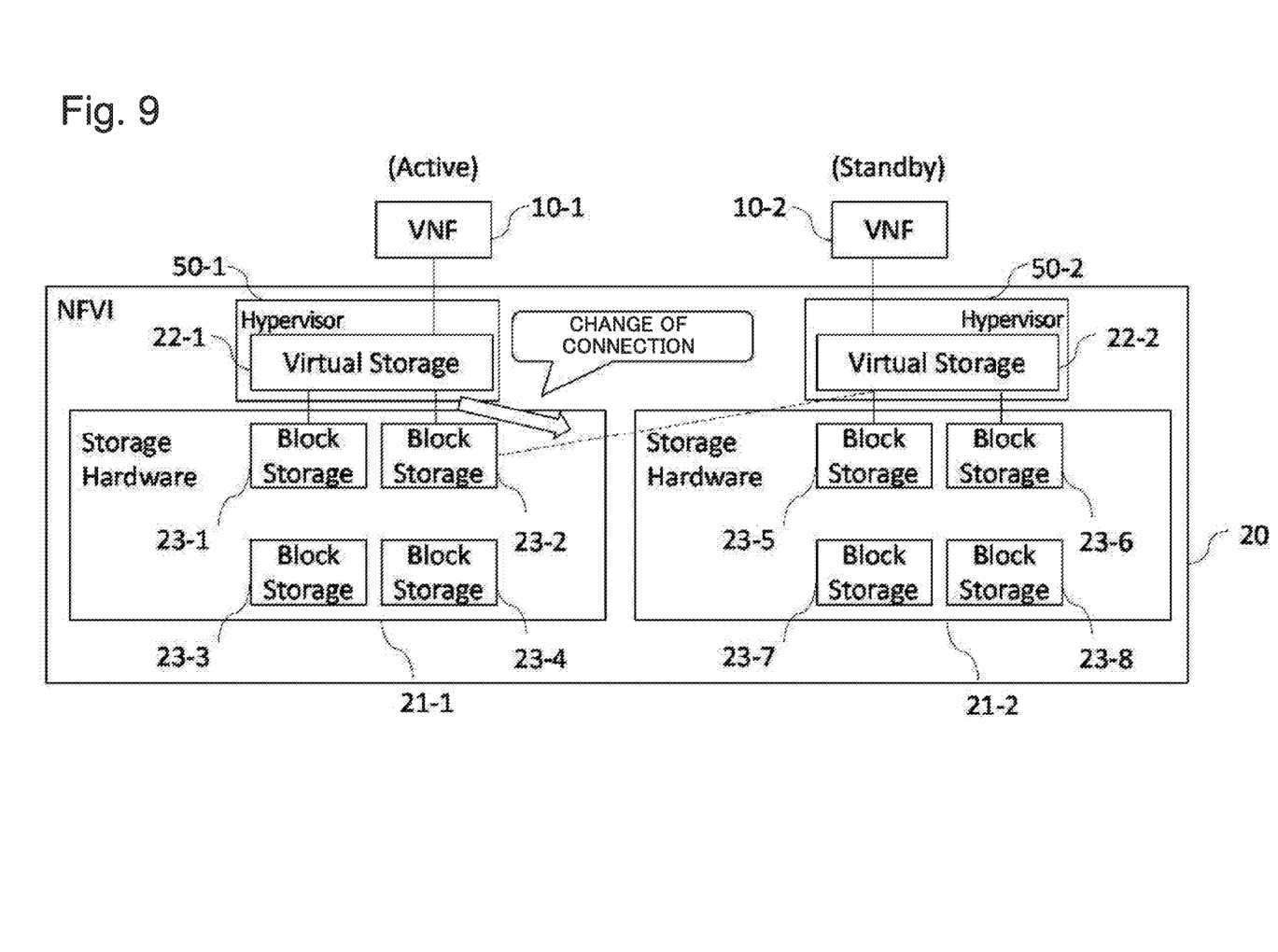
FIG. 9 is a block diagram illustrating an example of a configuration in which a VNF 10-1 and a VNF 10-2 of the first example embodiment are connected to different physical storages 21.

The VNF10-1 and the VNF 10-2 do not need to be connected to the same physical storage 21. For example, FIG. 9 is a block diagram illustrating an example of a configuration in which the VNF 10-1 and the VNF 10-2 are connected to different physical storages 21. The block storage 23-2 of the physical storage 21-1 connected to the VNF 10-1 may be connected to the VNF 10-2 connected to the physical storage 21-2.

As described above, the network system according to the first example embodiment of the present invention notifies the VIM 40 of the instruction to switch the virtual storage 22 connecting to the block storage 23 through the VNFM 30. In this way, it possible to switch between the active VNF 10-1 performing system operation and the standby VNF 10-2 standing ready to perform the system operation instead of the VNF10-1, and to connect a plurality of the VNFs to the same storage.

The example embodiments of the present invention are described above, however, the present invention is not limited to the above described example embodiments. The present invention can be practiced based on variants, replacements or adjustments of the respective example embodiments. Furthermore, the present invention can be practiced by any combination of the respective example embodiments. In other words, the present invention includes various variants or modifications feasible based on the whole disclosure and the technical idea of the present description. Therefore, it is needless to say that the present invention includes various variants or modifications which those skilled in the art will be able to make based on the whole disclosure and the technical idea of the present description including claims. Particularly, as for numerical ranges in the description, even when any numerical values or small ranges are not described, it should be interpreted that they are specifically described.

In the present invention, computers, central processing units (CPUs), micro-processing units (MPUs) or the like in the VNF 10, NFVI 20, VNFM 30 and VIM 20 may execute software (a program) for implementing the functions of the above described example embodiments. The VNF 10, NFVI 20, VNFM 30 and VIM 40 may acquire the software (a program) for implementing the functions of the above described example embodiments from various storage mediums such as a compact disc recordable (CD-R) or through a network. Any programs which the VNF, NFVI, VNFM or VIM acquires, or a storage medium storing such program constitutes the present invention. For example, the software (program) may be stored in advance in predetermined storage units included in the VNF 10, NFVI 20, VNFM 30 and VIM 40. Computers, CPUs or MPUs or the like in the VNF 10, NFVI 20, VNFM 30 and VIM 40 may read and execute a program codes of the acquired software (program).

The whole or part of the example embodiments disclosed above can be described as, but not limited to, the following supplementary notes.

[Supplementary Note 1]

A virtual network system includes
a first virtualized network function (VNF) including:
a storage; and
at least one processor,
the processor reading a software from the storage and performing operations, the operations including:
performing a network function implemented by the software;
a second VNF including:
a storage; and
at least one processor,
the processor reading a software from the storage and performing operation, the operation including:
providing a backup of the first VNF, and providing redundant configuration with the first VNF;
a network functions virtualization infrastructure (NFVI) including
a storage; and
at least one processor,
the processor reading a software from the storage and performing operations, the operation including:
providing a virtual resource that is a virtualization of a physical resource; and
a virtualized infrastructure manager (VIM) including
a storage; and
at least one processor,
the processor reading a software from the storage and performing operations, the operation including:
instructing the NFVI to provide the virtual resource as a resource for performing the first VNF and the second VNF, and
when the second VNF is performed and the first VNF is made a backup of the second VNF, instructing the NFVI to cancel provision of the virtual resource to the first VNF and to provide the virtual resource as a resource for performing the second VNF.

[Supplementary Note 2]

The virtual network system according to supplementary note 1, wherein
the operations performed by the processor of the VIM further includes performing a control to provide a volume of the physical resource as a virtual resource into units of blocks divided in a predetermined amount, and
providing a block provided as a virtual resource for performing the first VNF as a virtual resource for performing the second VNF.

[Supplementary Note 3]

The virtual network system according to supplementary note 2, wherein
the operations performed by the processor of the VIM further includes storing information to associate a block of a physical resource provided as a virtual resource with a VNF provided with the block, and
performing, based on the information, a control to provide a block provided as a virtual resource for performing the first VNF as a virtual resource for performing the second VNF.

[Supplementary Note 4]

The virtual network system according to any one of supplementary notes 1 to 3, further includes:
a virtualized network function manager (VNFM) including:
a storage; and
at least one processor,
the processor reading a software from the storage and performing operations, the operation including:
instructing, when receiving a notification to perform the second VNF and make the first VNF a backup of the second VNF from the first VNF, the VIM to cancel provision of a virtual resource to the first VNF and to provide the virtual resource as a resource for performing the second VNF.

[Supplementary Note 5]

A virtualized infrastructure manager (VIM) in a virtual network system having a redundant configuration by a first virtualized network function (VNF) performed as a network function implemented by software and
a second VNF provided as a backup of the first VNF, the VIM includes:
a storage; and
at least one processor,
the processor reading a software from the storage and performing operations, the operation including:
sending and receiving messages with a network functions virtualization infrastructure (NFVI) that provides a virtual resource that is a virtualization of a physical resource; and
when the second VNF is performed and the first VNF is made a backup of the second VNF, instructing the NFVI to cancel provision of a virtual resource to the first VNF and to provide the virtual resource as a resource for performing the second VNF.

[Supplementary Note 6]

The VIM according to supplementary note 5, wherein the operations further includes
performing a control to provide a volume of the physical resource as a virtual resource into units of blocks divided in a predetermined amount, and
providing a block provided as a virtual resource for performing the first VNF as a virtual resource for performing the second VNF.

[Supplementary Note 7]

The VIM according to supplementary note 6, wherein the operations further includes
storing information to associate a block of a physical resource provided as a virtual resource with a VNF provided with the block, and
performing a control to provide a block provided as a virtual resource for performing the first VNF as a virtual resource for performing the second VNF.

[Supplementary Note 8]

A virtual network control method in a virtual network system having a redundant configuration by a first virtualized network function (VNF) performed as a network function implemented by software and a second VNF provided as a backup of the first VNF, includes:
when the second VNF is performed and the first VNF is made a backup of the second VNF,
instructing to cancel provision of a virtual resource to the first VNF; and
to provide the virtual resource as a resource for performing the second VNF.

[Supplementary Note 9]

A non-transitory computer-readable recording medium embodying a program, the program causing a computer to perform a method, the method includes:
in a virtual network system having a redundant configuration by a first virtualized network function (VNF) performed as a network function implemented by software and a second VNF provided as a backup of the first VNF,
when the second VNF is performed and the first VNF is made a backup of the second VNF,
instructing to cancel provision of a virtual resource to the first VNF; and
to provide the virtual resource as a resource for performing the second VNF.

The present invention has been explained taking the above described example embodiments as exemplary examples. However, the present invention is not limited to the above described example embodiments. That is, the present invention can be practiced in various ways comprehensible to those skilled in the art within the scope of the present invention This application is based upon and claims the benefit of priority from Japanese patent application No. 2017-064167, filed on Mar. 29, 2017, the disclosure of which is incorporated herein in its entirety by reference.

REFERENCE SIGNS LIST 10, 10-1, 10-2 VNF
20 NFVI
21, 21-1, 21-2 Physical storage
22, 22-1, 22-2 Virtual storage
23, 23-1, 23-2, 23-3, 23-4, 23-5, 23-6, 23-7, 23-8 Block storage
30 VNFM
31 VNFM administration unit
32 VNFM control unit
33 VNFM communication unit
40 VIM
41 VIM administration unit
42 VIM control unit
43 VIM communication unit
50, 50-1, 50-2 Hypervisor

What is claimed is:

1. A virtual network system comprising:
a first virtualized network function (VNF) including:
a storage; and
at least one processor,
the processor reading a software from the storage and performing operations, the operations including:
performing a network function implemented by the software;
a second VNF including:
a storage; and
at least one processor,
the processor reading a software from the storage and performing operations, the operations including:
providing a backup of the first VNF, and providing redundant configuration with the first VNF;
a network functions virtualization infrastructure (NFVI) including
a storage; and
at least one processor,
the processor reading a software from the storage and performing operations, the operations including:
providing a virtual resource that is a virtualization of a physical resource; and
a virtualized infrastructure manager (VIM) including
a storage; and
at least one processor,
the processor reading a software from the storage and performing operations, the operation including:
instructing the NFVI to provide the virtual resource as a resource for performing the first VNF and the second VNF, and
when the second VNF is performed and the first VNF is made a backup of the second VNF, instructing the NFVI to cancel provision of the virtual resource to the first VNF and to provide the virtual resource as a resource for performing the second VNF.

2. The virtual network system according to claim 1, wherein
the operations performed by the processor of the VIM further includes performing a control to provide a volume of the physical resource as a virtual resource into units of blocks divided in a predetermined amount, and providing a block provided as a virtual resource for performing the first VNF as a virtual resource for performing the second VNF.

3. The virtual network system according to claim 2, wherein the operations performed by the processor of the VIM further includes storing information to associate a block of a physical resource provided as a virtual resource with a VNF provided with the block, and performing, based on the information, a control to provide a block provided as a virtual resource for performing the first VNF as a virtual resource for performing the second VNF.

4. The virtual network system according to claim 1, further comprising:

a virtualized network function manager (VNFM) including:
  a storage; and
  at least one processor,
  the processor reading a software from the storage and performing operations, the operation including:
    instructing, when receiving a notification to perform the second VNF and make the first VNF a backup of the second VNF from the first VNF, the VIM to cancel provision of a virtual resource to the first VNF and to provide the virtual resource as a resource for performing the second VNF.

5. A virtual network control method in a virtual network system having a redundant configuration by a first virtualized network function (VNF) performed as a network function implemented by software and a second VNF provided as a backup of the first VNF, comprising:

when the second VNF is performed and the first VNF is made a backup of the second VNF, instructing to cancel provision of a virtual resource to the first VNF; and to provide the virtual resource as a resource for performing the second VNF.

6. A non-transitory computer-readable recording medium embodying a program, the program causing a computer to perform a method, the method comprising:

in a virtual network system having a redundant configuration by a first virtualized network function (VNF) performed as a network function implemented by software and a second VNF provided as a backup of the first VNF, when the second VNF is performed and the first VNF is made a backup of the second VNF, instructing to cancel provision of a virtual resource to the first VNF; and to provide the virtual resource as a resource for performing the second VNF.

* * * * *